United States Patent
Berg et al.

(10) Patent No.: US 10,820,322 B2
(45) Date of Patent: Oct. 27, 2020

(54) REDUCING BIT RATE REQUIREMENT OVER AN UPLINK FRONTHAUL LINK

(71) Applicant: Telefonaktiebolaget LM Ericsson (publ), Stockholm (SE)

(72) Inventors: Miguel Berg, Sollentuna (SE);
Chenguang Lu, Sollentuna (SE);
Daniel Cederholm, Sollentuna (SE);
Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 16/309,756

(22) PCT Filed: Jun. 30, 2016

(86) PCT No.: PCT/SE2016/050668
§ 371 (c)(1),
(2) Date: Dec. 13, 2018

(87) PCT Pub. No.: WO2018/004409
PCT Pub. Date: Jan. 4, 2018

(65) Prior Publication Data
US 2019/0124662 A1 Apr. 25, 2019

(51) Int. Cl.
*H04W 4/00* (2018.01)
*H04W 72/04* (2009.01)
(Continued)

(52) U.S. Cl.
CPC .......... *H04W 72/0453* (2013.01); *H04L 1/00* (2013.01); *H04L 1/0001* (2013.01); *H04W 28/06* (2013.01)

(58) Field of Classification Search
CPC ........ H04L 1/00; H04L 1/0001; H04W 28/06; H04W 72/0453
See application file for complete search history.

(56) References Cited

U.S. PATENT DOCUMENTS

| | | | |
|---|---|---|---|
| 8,989,088 B2 | 3/2015 | Ling | |
| 2011/0032910 A1* | 2/2011 | Aarflot | H04W 88/085 370/335 |

(Continued)

FOREIGN PATENT DOCUMENTS

| | | | |
|---|---|---|---|
| EP | 3116261 A1 | 11/2017 | |
| WO | 2014076004 A2 | 5/2014 | |

(Continued)

OTHER PUBLICATIONS

International Search Report and Written Opinion for International Patent Application No. PCT/SE2016/050668, dated Feb. 27, 2017, 11 pages.

*Primary Examiner* — Minh Trang T Nguyen
(74) *Attorney, Agent, or Firm* — Sage Patent Group (57) ABSTRACT

It is provided a method for reducing bit rate requirement over an uplink fronthaul link. The method is performed in a fronthaul transmitter of a radio network node and comprises the steps of: determining a group of frequency-domain resource elements having been received over a wireless channel (40); estimating channel information (42); reducing a number of bits for representing the respective frequency-domain resource element, to thereby obtain a modified resource element (44); transmitting the modified resource elements of the group over the fronthaul link to a fronthaul receiver (46); and transmitting compression metadata (48), indicating how the reduction was performed, over the fronthaul link to the fronthaul receiver which performs the steps of receiving the modified resource elements (50), receiving the compression metadata (52) and expanding the resource elements to increase the number of bits for representing the frequency-domain resource elements (54).

28 Claims, 3 Drawing Sheets

(51) Int. Cl.
*H04L 1/00* (2006.01)
*H04W 28/06* (2009.01)

(56) References Cited

U.S. PATENT DOCUMENTS

| | | | |
|---|---|---|---|
| 2012/0008696 A1 | 1/2012 | Wegener | |
| 2013/0279452 A1* | 10/2013 | Liu | H04W 72/1268 370/329 |
| 2014/0226736 A1* | 8/2014 | Niu | H04L 27/2628 375/260 |
| 2015/0124688 A1* | 5/2015 | Xu | H04L 27/2607 370/312 |
| 2015/0124769 A1* | 5/2015 | Zhang | H04B 7/0634 370/329 |
| 2016/0270080 A1* | 9/2016 | Zeng | H04J 1/08 |
| 2016/0315674 A1* | 10/2016 | Li | H04L 25/03343 |
| 2018/0146452 A1* | 5/2018 | Zhang | H04W 72/005 |
| 2018/0332617 A1* | 11/2018 | Zeng | H04W 74/08 |

FOREIGN PATENT DOCUMENTS

| | | |
|---|---|---|
| WO | 2014110730 A1 | 7/2014 |
| WO | 2015143602 A1 | 10/2015 |

\* cited by examiner

REDUCING BIT RATE REQUIREMENT OVER AN UPLINK FRONTHAUL LINK

This application is a 35 U.S.C. § 371 national phase filing of International Application No. PCT/SE2016/050668, filed Jun. 30, 2016, the disclosure of which is incorporated herein by reference in its entirety.

TECHNICAL FIELD

The invention relates to methods, fronthaul transmitters, fronthaul receivers, computer programs and computer program products for reducing bit rate requirements for an uplink fronthaul link.

BACKGROUND

For a radio base station (RBS), the term fronthaul is used to designate an interface between baseband processing unit and an antenna unit, e.g. in a remote radio unit. Traditional fronthaul such as CPRI (Common Public Radio Interface), is based on time-domain samples of a complex baseband radio signal, where each antenna carrier is represented by a stream of bits. For 5G (Fifth Generation) mobile communication systems with radio bandwidths of hundreds of MHz, the current CPRI has too high bandwidth requirements. Also, for Centralized RAN (Radio Access Network) applications, latency requirements restrict the opportunities for centralisation. Therefore, various other fronthaul interface proposals are discussed in the industry. One idea is to move more functionality from the (centralized) baseband processing units (BPU) to the remote radio units (RRU).

As an example, for signals like LTE (Long Term Evolution), which are generated in frequency domain, it is possible to reduce fronthaul capacity requirements if a frequency-domain sampled interface is used. A frequency-domain interface can be achieved from time-domain IQ samples (e.g. in the RRU) by the steps of synchronization, removal of cyclic prefix, and FFT. Such a method is described in U.S. Pat. No. 8,989,088, where the frequency domain coefficients are attenuated in accordance with an attenuation profile so that the former least-significant bits are truncated. After the attenuation, the most significant bits are zero and do not have to be transported over the fronthaul.

Although frequency domain fronthaul interfaces can have lower bit rate than time domain interfaces, the increasing need for more air interface bandwidth and lower cost per bit means that it is highly desired to reduce fronthaul bit rate further.

Downlink fronthaul signals have rather limited dynamic range, allowing quantization with only few bits, but uplink fronthaul signals can experience large power variations due to the effect of the radio channel. Moreover, for the uplink, UEs (User Equipments) have limited output power and uplink power control is limited in range and not instantaneous, whereby a power difference between Resource Blocks (RBs) of 40 dB or more is possible. Such a dynamic range combined with a peak-to-average ratio of the uplink signal means that the number of bits that may be needed for a sample is in the order of 10+10 bits (real+imaginary values) or even 16+16 bits.

The method described in U.S. Pat. No. 8,989,088 does not give detailed performance information, but in an example, compression from 16+16 to 8+8 bits is assumed. While this is an improvement, further compression would be of great benefit.

SUMMARY

It is an object to reduce the bitrate requirements on the fronthaul link of a radio network node.

According to a first aspect, it is provided a method for reducing bit rate requirement over an uplink fronthaul link. The method is performed in a fronthaul transmitter of a radio network node and comprises the steps of: determining a group of frequency-domain resource elements having been received over a wireless channel; estimating channel information in the group of frequency-domain resource elements, the channel information relating to the wireless channel; reducing for each frequency-domain resource element in the group, using the estimated channel information, a number of bits for representing the respective frequency-domain resource element, to thereby obtain a modified resource element; transmitting the modified resource elements of the group over the fronthaul link to a fronthaul receiver; and transmitting compression metadata, indicating how the reduction was performed, over the fronthaul link to the fronthaul receiver.

The step of reducing a number of bits may comprise, for each resource element, compensating for effects of the wireless channel based on the channel information.

The step of reducing a number of bits may comprise, for each resource element, reducing the number of bits based on possible values of the resource element.

The step of estimating channel information may comprise estimating the channel information based on at least one demodulation reference signal.

The step of estimating channel information may comprise estimating the channel information based on at least one sounding reference signal.

The step of estimating channel information may comprise estimating the channel information based on user data.

The compression metadata may comprise the estimated channel information.

The step of reducing a number of bits may comprise interpolating between two instances of channel information to achieve an individual channel information for each frequency-domain resource element.

The group of frequency-domain resource elements may be a group of frequency-domain resource elements within a resource block, wherein all of the frequency-domain resource elements are associated with one specific user equipment.

The step of reducing the number of bits may comprise aligning frequency-domain resource element values with possible constellation points of a modulation used for each frequency-domain resource element.

The fronthaul transmitter may refrain from decoding the frequency-domain resource elements.

According to a second aspect, it is provided a fronthaul transmitter for reducing bit rate requirement over an uplink fronthaul link. The fronthaul transmitter is arranged to form part of a radio network node. The fronthaul transmitter comprises: a processor; and a memory storing instructions that, when executed by the processor, causes the fronthaul transmitter to: determine a group of frequency-domain resource elements having been received over a wireless channel; estimate channel information in the group of frequency-domain resource elements, the channel information relating to the wireless channel; reduce for each frequency-domain resource element in the group, using the estimated channel information, a number of bits for representing the respective frequency-domain resource element, to thereby obtain a modified resource element; transmit the modified resource elements of the group over the fronthaul link to a fronthaul receiver; and transmit compression metadata, indicating how the reduction was performed, over the fronthaul link to the fronthaul receiver.

The instructions to reduce a number of bits may comprise instructions that, when executed by the processor, causes the fronthaul transmitter to, for each resource element, compensate for effects of the wireless channel based on the channel information.

The instructions to reduce a number of bits may comprise instructions that, when executed by the processor, causes the fronthaul transmitter to, for each resource element, reduce the number of bits based on possible values of the resource element.

The instructions to estimate channel information may comprise instructions that, when executed by the processor, causes the fronthaul transmitter to estimate the channel information based on at least one demodulation reference signal.

The instructions to estimate channel information may comprise instructions that, when executed by the processor, causes the fronthaul transmitter to estimate the channel information based on at least one sounding reference signal.

The instructions to estimate channel information may comprise instructions that, when executed by the processor, causes the fronthaul transmitter to estimate the channel information based on user data.

The compression metadata may comprise the estimated channel information.

The instructions to reduce a number of bits may comprise instructions that, when executed by the processor, causes the fronthaul transmitter to interpolate between two instances of channel information to achieve an individual channel information for each frequency-domain resource element.

The group of frequency-domain resource elements may be a group of frequency-domain resource elements within a resource block, wherein all of the frequency-domain resource elements are associated with one specific user equipment.

The instructions to reduce the number of bits may comprise instructions that, when executed by the processor, causes the fronthaul transmitter to align frequency-domain resource element values with possible constellation points of a modulation used for each frequency-domain resource element.

The fronthaul transmitter may comprise instructions that, when executed by the processor, causes the fronthaul transmitter to refrain from decoding the frequency-domain resource elements.

According to a third aspect, it is provided a fronthaul transmitter comprising: means for determining a group of frequency-domain resource elements having been received over a wireless channel; means for estimating channel information in the group of frequency-domain resource elements, the channel information relating to the wireless channel; means for reducing for each frequency-domain resource element in the group, using the estimated channel information, a number of bits for representing the respective frequency-domain resource element, to thereby obtain a modified resource element; means for transmitting the modified resource elements of the group over the fronthaul link to a fronthaul receiver to thereby reducing bit rate requirement over an uplink fronthaul link; and means for transmitting compression metadata, indicating how the reduction was performed, over the fronthaul link to the fronthaul receiver.

According to a fourth aspect, it is provided a computer program for reducing bit rate requirement over an uplink fronthaul link. The computer program comprises computer program code which, when run on a the fronthaul transmitter being arranged to form part of a radio network node causes the fronthaul transmitter to: determine a group of frequency-domain resource elements having been received over a wireless channel; estimate channel information in the group of frequency-domain resource elements, the channel information relating to the wireless channel; reduce for each frequency-domain resource element in the group, using the estimated channel information, a number of bits for representing the respective frequency-domain resource element, to thereby obtain a modified resource element; transmit the modified resource elements of the group over the fronthaul link to a fronthaul receiver; and transmit compression metadata, indicating how the reduction was performed, over the fronthaul link to the fronthaul receiver.

According to a fifth aspect, it is provided a computer program product comprising a computer program according to the fourth aspect and a computer readable means on which the computer program is stored.

According to a sixth aspect, it is provided a method for reducing bit rate requirement over an uplink fronthaul link. The method being performed in a fronthaul receiver of a radio network node and comprises the steps of: receiving, over the fronthaul link from a fronthaul transmitter, frequency-domain resource elements of a group of frequency-domain resource elements having been received over a wireless channel; receiving compression metadata indicating how a bit usage reduction was performed for the frequency-domain resource elements; and increasing for each frequency-domain resource element in the group, using the compression metadata, a number of bits for representing the respective frequency-domain resource element, the increasing being essentially an inverse operation of a corresponding reduction performed by the fronthaul transmitter.

The compression metadata may be estimated channel information obtained by the fronthaul transmitter.

The step of increasing a number of bits may comprise interpolating between two instances of channel information to achieve an individual channel information for each frequency-domain resource element.

The group of frequency-domain resource elements may be a group of frequency-domain resource elements within a resource block, wherein all of the frequency-domain resource elements are associated with one specific user equipment.

The step of increasing a number of bits may comprise, for each resource element, decompensating for effects of wireless channel compensation performed by the fronthaul transmitter, based on the channel information.

According to a seventh aspect, it is provided a fronthaul receiver for reducing bit rate requirement over an uplink fronthaul link. The fronthaul receiver is arranged to form part of a radio network node. The fronthaul transmitter comprises: a processor; and a memory storing instructions that, when executed by the processor, causes the fronthaul receiver to: receive, over the fronthaul link from a fronthaul transmitter, frequency-domain resource elements of a group of frequency-domain resource elements having been received over a wireless channel; receive compression metadata indicating how a bit usage reduction was performed for the frequency-domain resource elements; and increase for each frequency-domain resource element in the group, using the compression metadata, a number of bits for representing the respective frequency-domain resource element, the increasing being essentially an inverse operation of a corresponding reduction performed by the fronthaul transmitter.

The compression metadata may be estimated channel information obtained by the fronthaul transmitter.

The instructions to increase a number of bits may comprise instructions that, when executed by the processor, causes the fronthaul receiver to interpolate between two instances of channel information to achieve an individual channel information for each frequency-domain resource element.

The group of frequency-domain resource elements may be a group of frequency-domain resource elements within a resource block, wherein all of the frequency-domain resource elements are associated with one specific user equipment.

The instructions to increase a number of bits may comprise instructions that, when executed by the processor, causes the fronthaul receiver to, for each resource element, decompensate for effects of wireless channel compensation performed by the fronthaul transmitter, based on the channel information.

According to an eighth aspect, it is provided a fronthaul receiver comprising: means for receiving, over the fronthaul link from a fronthaul transmitter, frequency-domain resource elements of a group of frequency-domain resource elements having been received over a wireless channel; means for receiving compression metadata indicating how a bit usage reduction was performed for the frequency-domain resource elements; and means for increasing for each frequency-domain resource element in the group, using the compression metadata, a number of bits for representing the respective frequency-domain resource element, the increasing being essentially an inverse operation of a corresponding reduction performed by the fronthaul transmitter.

According to a ninth aspect, it is provided a computer program for reducing bit rate requirement over an uplink fronthaul link. The computer program comprises computer program code which, when run on a the fronthaul receiver being arranged to form part of a radio network node causes the fronthaul receiver to: receive, over the fronthaul link from a fronthaul transmitter, frequency-domain resource elements of a group of frequency-domain resource elements having been received over a wireless channel; receive compression metadata indicating how a bit usage reduction was performed for the frequency-domain resource elements; and increase for each frequency-domain resource element in the group, using the compression metadata, a number of bits for representing the respective frequency-domain resource element, the increasing being essentially an inverse operation of a corresponding reduction performed by the fronthaul transmitter.

According to a tenth aspect, it is provided a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein present the use of channel estimation in order to decrease the dynamic range requirements of uplink frequency domain IQ samples that should be sent on the fronthaul interface. This is exploited to reduce the number of bits required for each sample. The invention is intended for uplink since this is where the largest dynamic range problem is seen.

Figure 1:
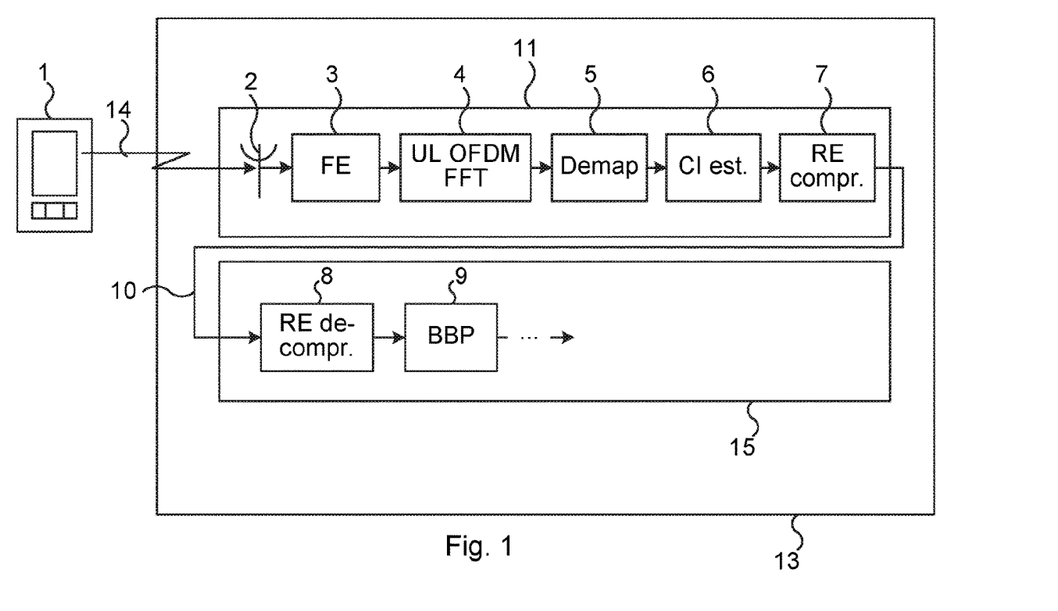
FIG. 1 is a schematic diagram illustrating an environment in which embodiments presented herein can be applied.

FIG. 1 is a schematic diagram illustrating an environment in which embodiments presented herein can be applied. The environment forms part of a cellular communication network. A radio network node 13, is here provided and can e.g. be an evolved Node Bs, also known as eNode Bs or eNBs. The radio network node 13 could also be in the form of Node Bs, BTSs (Base Transceiver Stations) and/or BSSs (Base Station Subsystems), etc. The radio network node 13 provides radio connectivity over a wireless interface 14 to a plurality of wireless devices 1 (while only one is shown here). The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 1 can comprise a number of wires for internal and/or external purposes.

The cellular communication network may e.g. comply with LTE (Long Term Evolution), or any other current or future wireless network, such as LTE-Advanced or 5G, as long as the principles described hereinafter are applicable.

Over the wireless interface 14, uplink (UL) communication (shown) occurs from the wireless device 1 to the radio network node 13 and downlink (DL) communication (not shown) occurs from the radio network node 13 to the wireless device 1. The quality of the wireless radio interface to each wireless device 1 can vary over time and depending on the position of the wireless device 1, due to effects such as fading, multipath propagation, interference, etc.

The radio network node 13 is also connected to a core network (not shown) for connectivity to central functions and a wide area network, such as the Internet.

The radio network node 13 is here divided into two parts, here denoted a remote radio unit 11 and a baseband processing unit 15, connected via a so called fronthaul link 10. By dividing the radio base station 13 into the remote radio unit 11 and the baseband processing unit 15, the remote radio unit 11 does not need to be in the same location as the baseband processing unit 15. This gives great flexibility in terms of topology when the cellular network is deployed.

For uplink communication, the remote radio unit 11 is a fronthaul transmitter and the baseband processing unit 15 is a fronthaul receiver. Only uplink communication is discussed here, so hereinafter, the remote radio unit is denoted the fronthaul transmitter 11 and the baseband processing unit is denoted the fronthaul receiver 15.

The fronthaul transmitter 11 comprises one or more antennas 2 (can also be provided externally from the fronthaul transmitter 11). A front end module 3 receives the uplink signal from the antenna(s) 2 and performs duplex processing, passing through a low noise amplifier (LNA) and downconverts the RF (Radio Frequency) signal to baseband. Also, the baseband signal is converted in an analogue to digital (A/D) conversion. After the front end module 3, there is an uplink OFDM (Orthogonal Frequency Domain Modulation) FFT (Fast Fourier Transform) module. The FFT has a size at least corresponding to the uplink bandwidth e.g. 20 MHz.

In a demap module 5, the signal is demapped, at least partly, into resource elements. The demapping can be performed blindly or based on other available information, available to the radio network node. If demapping is done, this can e.g. be based on the DRS, which is unique for each wireless device. Moreover, this module optionally identifies which resource elements carry reference signals, control signals and user data.

In a CI (Channel Information) estimation module 6, channel information relating to characteristics of the wireless channel 14 is obtained as explained in more detail below.

In a RE (Resource Element) compression module 7, each resource element is compressed, i.e. the number of bits required for each resource element is reduced, as explained in more detail below, to a modified resource element. In case of LTE which utilises SC-FDMA (Single Carrier-Frequency Division Multiple Access), smaller IFFTs (Inverse FFT) are applied, one for each allocated wireless device. However, the IFFTs can be applied in the fronthaul transmitter 11, e.g. in the compression module 7 prior to the compression, or in the fronthaul receiver 15. When uplink MIMO (Multiple Input Multiple Output) is applied, the compression module 7 can apply layer separation to separate the separate spatial MIMO layers.

A signal containing modified resource elements, as well as compression metadata, is then transferred over the fronthaul link 10 to the fronthaul receiver 15. It should be noted that the modified resource elements may not only contain user data but also e.g. control signals and reference signals.

By transferring e.g. the demodulation reference signals over the fronthaul link, the baseband processing unit can use them to perform a more powerful and accurate channel estimation prior to regular equalization, demodulation and decoding.

The fronthaul receiver 15 comprises a RE decompressor 8 which expands each modified resource element to a representation corresponding to the respective resource element prior to compression, at least in some respect. For instance, in some cases it may be sufficient to restore only magnitude of the original signal. The magnitude of the received signal can then be used by the baseband processing module e.g. to estimate path loss and noise floor. Restoring the phase can be useful when channel information is noisy, but if the channel information is not noise, the baseband processing module can derive the correct phase of the constellation points from the reference symbols, which are also transmitted compressed over the fronthaul link However, it is to be noted that the compression is a lossy compression and the exact original resource element values cannot be recreated. Optionally, the RE decompressor applies a wireless device specific FFT block to restore the SC-FDMA signal if desired. This could reduce requirements on an existing baseband processor to be adapted to embodiments presented herein.

A baseband processing module 9 then performs baseband processing as known in the art per se.

Figure 2:
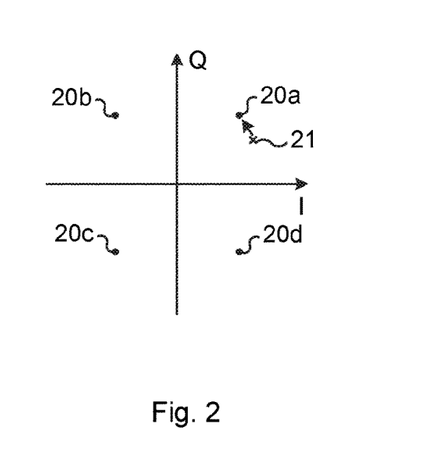
FIG. 2 is a schematic graph illustrating possible values of resource elements used in the environment of FIG. 1.

FIG. 2 is a schematic graph illustrating possible values of resource elements used in the environment of FIG. 1. This scenario is applicable when the SC-FDMA IFFT is applied in the fronthaul transmitter, or when a non-LTE standard is applied.

The horizontal axis represents in-phase component I and the horizontal axis represents quadrature component Q. This example illustrates the use of QPSK (Quadrature Phase Shift Keying), also known as 4-QAM (Quadrature Amplitude Modulation). This is a modulation where there are four possible values in the I/Q plane: a first value 20a, a second value 20b, a third value 20c and a fourth value 20d, each provided in a respective quadrant.

A resource element 21 has been received and is plotted in the graph. The knowledge of the modulation scheme used, and thus possible values for a resource element is exploited to reduce the number of bits required to encode the resource element. In this example, the resource element 21 is closest to the first value 20a, whereby the resource element 21 is approximated to the first value 20a. When this is performed for all values of received resource elements, the resource elements can be encoded using only two bits. However, in order to support soft decoding in the baseband processing module, more bits can be added. Compared to a pure A/D conversion of the resource element, which can e.g. involve 16 bits for the I axis and 16 bits for the Q axis, the bit reduction for a resource element is potentially enormous. 64 QAM modulated signals can be represented in as little as 3 bits for each of the I and Q axes, i.e. 6 bits for a sample, compared to 32 bits in the prior art.

Figure 3:
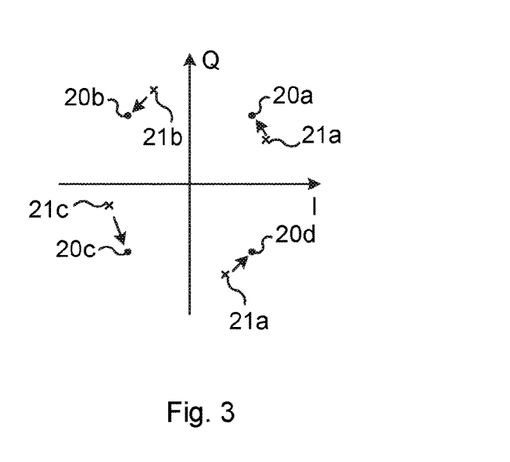
FIG. 3 is a schematic graph illustrating channel compensation to possible values of resource elements of FIG. 2.

FIG. 3 is a schematic graph illustrating channel compensation to possible values of resource elements of FIG. 2. In this example, a first resource element 21a is approximated to the first value 20a, a second resource element 21b is approximated to the second value 20b, a third resource element 21c is approximated to the third value 20c and a fourth resource element 21d is approximated to the fourth value 20d. Looking at all of these together, it can be seen that the wireless channel likely results in a phase shift of about $-\pi/9$ radians. However, it is also possible that the wireless channel results in a phase shift of $\pi/2-\pi/9$. In either case, embodiments presented herein do not perform actual demodulation—only reduction of information. Hence, it is not important what the actual phase shift is for the compression at the fronthaul transmitter, as long as the fronthaul receiver performs the reverse operation, in at least some aspect to allow demodulation.

In other words, the fronthaul transmitter reduces the number of possible values of the resource elements to thereby reduce the number of bits required to represent the resource elements. This results in modified resource elements. The fronthaul transmitter transfers the modified resource elements to the fronthaul transmitter, along with compression metadata indicating how the resource elements were modified (e.g. the phase shift shown in FIG. 3). It is to be noted that the compression metadata can be applied for a large group of resource elements, whereby the overhead for the compression metadata is not significant. The fronthaul receiver receives the modified resource elements and the compression metadata and is thus able to reverse the operation performed at the fronthaul transmitter, e.g. to get an approximation of the original values 20a-d of FIG. 3. Since the compression is lossy, the original values cannot be recreated to be identical to prior to the compression.

When SC-FDMA is used but the SC-FDMA IFFT is not applied prior to compression, the plot (not shown) corresponding to FIG. 3 would simply show a complex Gaussian distribution. Still, independent of whether resource elements have complex Gaussian distribution or if constellation points are visible, the use of phase and scaling compensation can provide great bitrate reduction. For example, compensating the magnitude scaling reduces the dynamic range of the resource elements, which means that fewer quantization bits are needed for a given SNR (Signal-to-noise Ratio) requirement. Further, compensating the phase yields coherent signals between antenna branches, which enables coherent diversity combining in the fronthaul transmitter whenever it is desired to reduce the fronthaul bitrate further.

Figure 4:
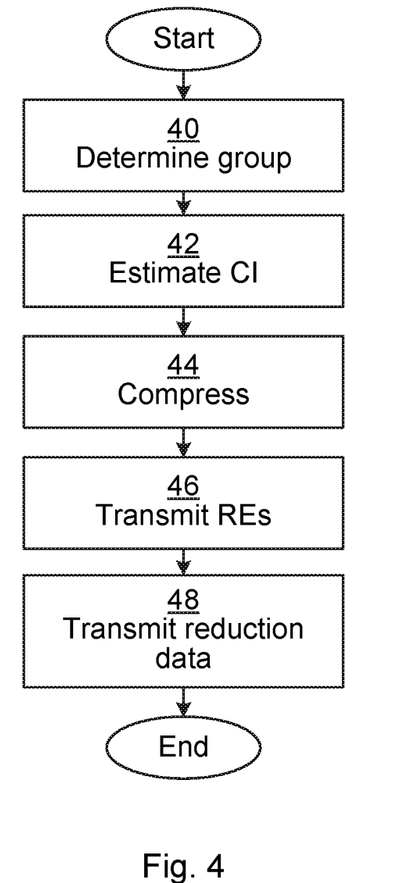
FIG. 4 is a flow chart illustrating a method, performed in a fronthaul transmitter, for reducing bit rate requirement over an uplink fronthaul link.

FIG. 4 is a flow chart illustrating a method, performed in a fronthaul transmitter of a radio network node, for reducing bit rate requirement over an uplink fronthaul link.

In a determine group step 40, a group of frequency-domain resource elements having been received over a wireless channel is determined. The group can be selected such that samples within the group have high correlation, i.e. the bandwidth of the group is less than or equal to the channel coherence bandwidth and the duration is less or equal to the channel coherence time. The group of frequency-domain resource elements can be a group of frequency-domain resource elements within a resource block, but other sizes are also possible, e.g. a group of resource blocks belonging to the same UE, or a fraction of a resource block. All of the frequency-domain resource elements are associated with one specific UE. The group can also cover multiple resource blocks associated with the same UE.

The group can be selected such that compensation is performed based on past, present, or future channel estimates. One issue with future channel estimates is that it increases latency since it may be necessary to buffer the signal several OFDM symbols until the future channel estimate is obtained. One example is where LTE demodulation reference signals (DRS) are used; DRS normally appear on the fourth OFDM symbol in an RB (Resource Block). If only DRS in the current RB are used, bidirectional channel compensation is needed. E.g. the signal may need to be buffered four OFDM symbols so that the DRS can be read, before the REs in the first OFDM symbol can be compensated. Such long latency may be unacceptable for some applications and therefore forward prediction may be preferred.

In forward prediction, the DRS is used for channel estimates for following REs until the next DRS. This implies that the group is selected to span over two resource blocks—the end of one resource block (after the DRS) as well as the beginning of the next resource block (before the next DRS).

If it is not possible to do forward compensation based on e.g. DRS or SRS (Sounding Reference Signal) in previous OFDM RBs, one option is to start with forward compensation based on data or control symbols. For QPSK, the magnitude is constant, which gives a good channel information estimate. Also, if it is known that QPSK is used, channel information phase can be estimated with an error corresponding to an integer multiple of $\pi/2$ without decoding the data symbols. Such an estimate is sufficient to get compensated RE samples that can be sampled with quantization levels aligned with constellation points.

In an estimate CI step 42, channel information in the group of frequency-domain resource elements is estimated. The channel information relates to the wireless channel. For instance, the channel information can describe phase shift and/or magnitude effect of the wireless channel.

The channel information can be estimated based on at least one demodulation reference signal (DRS). The channel information can be estimated based on at least one sounding reference signal. The channel information can be estimated based on user data. It is possible to use a reference signal from another group within the correlation bandwidth and the coherence time. The channel information can be scaled to include, e.g. peak-to-average value of the used modulation format so that the quantizer range can be used optimally.

In a compress step 44, a number of bits for representing the respective frequency-domain resource element is reduced. This is performed for each frequency-domain resource element in the group, using the estimated channel information, to thereby obtain a modified resource element.

Here it is assumed that each frequency domain IQ sample corresponds to one resource element, i.e. one subcarrier for the duration of one OFDM (Orthogonal Frequency-Division Multiplexing) symbol.

This step can involve interpolating between two instances of channel information to achieve an individual channel information for each frequency-domain resource element. The same interpolation can be performed in both the fronthaul transmitter and receiver. In this way, a better estimate of the channel estimate is achieved without the need for compression metadata to contain individual channel information for each resource element.

This step can comprise, for each resource element, compensating for effects of the wireless channel based on the channel information. This could for example be performed by multiplying RE samples by the inverse of the complex channel information. Additional scaling can be included in this multiplication if needed. The channel information can be a coarse estimate, less accurate and with more noise than in a typical baseband processing unit, since the compression metadata sent over the fronthaul link allows the fronthaul receiver to undo the channel compensation (apart from the effects of quantization). A baseband processing unit can then apply a more powerful and accurate channel estimation.

This step can also comprise, for each resource element, reducing the number of bits based on possible values of the resource element. The possible values can e.g. be based on a modulation scheme which is used. As an example, for a regular OFDM uplink (non-LTE) or SC-FDMA with SC- FDMA IFFT included, knowledge of the modulation scheme allows scaling of the resource elements so that I and Q coordinates of each constellation point (in a noise-free case) end up exactly on some of the quantizer's output values. For M-QAM modulation where M is even, the average constellation energy is $(M-1) \cdot d^2/6$ where d is the distance between the nearest-neighbour constellation points. If M is known, and the average constellation energy is known from e.g. the reference symbols (including any known configured offset between data and reference symbols), it is possible to solve for the distance d. The quantizer for I and Q should then preferably have a step size equal to an integer multiple of d. As an alternative to changing the quantizer step size according to distance d, the quantizer can have a fixed step size and instead a factor 1/d can be included in the additional scaling performed when multiplying the RE samples by the inverse of the complex channel estimate. If the quantizer's step size is greater than d, there will be intermediate values between constellation points, allowing soft decoding in a baseband processing unit. Intermediate values require more bits in the quantizer but entropy coding can be used to partially mitigate the increase in number of bits since intermediate values between constellation points are less likely to occur. It is to be noted, however, that actual demodulation does not need to occur. In other words, the fronthaul transmitter can refrain from both demodulation and decoding, thereby greatly reducing requirements on the fronthaul transmitter. Requirements on the fronthaul transmitter are further reduced since only coarse channel estimation is needed in order to achieve bitrate reduction over the fronthaul link. The more accurate channel estimation needed for demodulation and decoding can be kept in the baseband processing unit, which may be centralized.

This step can also comprise, for each resource element, reducing the number of bits based on information about an SNR requirement for the resource element. In other words, a lower number of bits might be sufficient to represent the resource element due to a reduced dynamic range when the SNR requirement is applied. For example, when low-order modulation is used, SNR requirements are usually low, allowing quantization with fewer bits than for high-order modulation. SNR requirements can also be derived from channel information together with knowledge about the noise floor. When channel information indicates that the signal is close to the thermal noise floor, it is possible to use fewer bits for quantization even if the modulation type is not known. As long as the quantization noise ends up sufficiently below the thermal noise, there will be no noticeable performance degradation in the radio receiver.

Optionally, the frequency-domain resource element values are aligned with possible constellation points of a modulation used for each frequency-domain resource element, e.g. as shown in FIGS. 2-3 and explained above.

Optionally, this step also includes the use of entropy coding, e.g. Huffman coding.

In a transmit REs step 46, the modified resource elements of the group are transmitted over the fronthaul link to a fronthaul receiver (15).

In a transmit reduction data step 48, compression metadata, indicating how the reduction was performed, is transmitted over the fronthaul link to the fronthaul receiver. The compression metadata can e.g. comprise the estimated channel information. Moreover, the compression metadata can comprise any scaling factor used to align quantization levels with possible values, e.g. constellation points. The compression metadata can comprise any one or more of spatial, time and frequency channel components. Furthermore, the compression metadata may also include a duration of applicability, e.g. one TTI (Transmission Time Interval) or 0.5 TTI, which can depend on how quickly the channel conditions vary.

If DRS signals and other reference signals (e.g. SRS, Sounding Reference Signals) are not available, blind estimation from data is possible since even a coarse estimate can give noticeable dynamic range reduction.

The channel information is sent over the fronthaul, using one or a few complex values per group, while the compensated RE samples can be sent with lower resolution compared with the case before the invention is applied. On the other end of the fronthaul link, the uplink signal's original dynamic range can be restored (if desired) by the use of the channel information. This restoration allows use of more advanced channel estimation and soft decoding in the baseband processing unit.

Using this method, uplink fronthaul bit rate is significantly reduced by decreased dynamic range for each resource element. Additional fronthaul bit rate reduction is possible by aligning quantization levels to constellation points when channel estimation is sufficiently good. Also, lower complexity is needed in RRU compared to full channel estimation. Good compression is achieved even with noisy channel information. Also, compression is not affected if channel information phase is wrong by a multiple of $\pi/2$, which could be the case if blind estimation from QPSK data/control samples is used.

Figure 5:
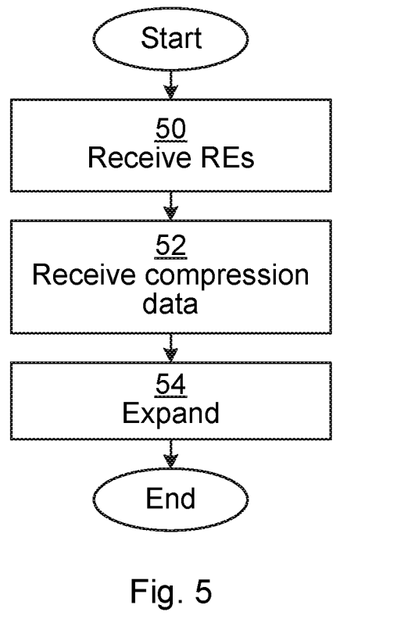
FIG. 5 is a flow chart illustrating a method, performed in a fronthaul receiver, for reducing bit rate requirement over an uplink fronthaul link.

FIG. 5 is a flow chart illustrating a method, performed in a fronthaul receiver of a radio network node, for reducing bit rate requirement over an uplink fronthaul link.

In a receive REs step 50, frequency-domain resource elements are received over the fronthaul link (10) from a fronthaul transmitter. The frequency-domain resource elements are of a group of frequency-domain resource elements having been received over a wireless channel.

In a receive compression data step 52, compression metadata is received. The compression metadata indicates how a bit usage reduction was performed for the frequency-domain resource elements.

In an expand step 54, a number of bits for representing the respective frequency-domain resource element is increased. This is performed for each frequency-domain resource element in the group, using the compression metadata. The increasing is essentially an inverse operation of a corresponding reduction performed by the fronthaul transmitter, e.g. as part of step 44 of FIG. 4.

Figure 6:
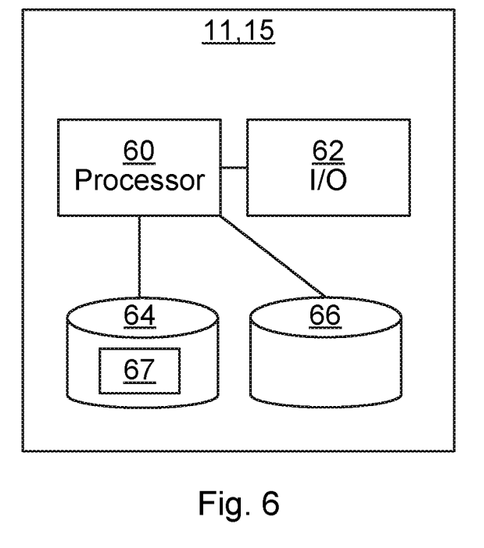
FIG. 6 is a schematic diagram illustrating components of the fronthaul transmitter or fronthaul receiver of FIG. 1 according to one embodiment.

FIG. 6 is a schematic diagram illustrating components of the fronthaul transmitter 11 or fronthaul receiver 15 of FIG. 1 according to one embodiment. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the methods described with reference to FIGS. 4 and 5 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The fronthaul transmitter 11 or fronthaul receiver 15 further comprises an I/O interface 62 for communicating with other external entities.

Other components of the fronthaul transmitter 11 or fronthaul receiver 15 are omitted in order not to obscure the concepts presented herein.

Figure 7:
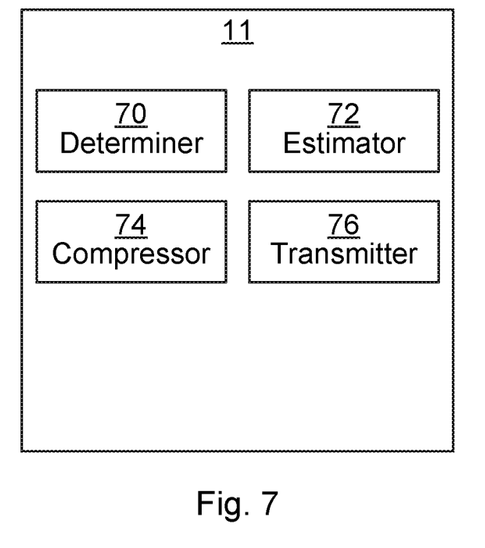
FIG. 7 is a schematic diagram showing functional modules of the fronthaul transmitter of FIG. 1 according to one embodiment.

FIG. 7 is a schematic diagram showing functional modules of the fronthaul transmitter of FIG. 1 according to one embodiment. The modules are implemented using software instructions such as a computer program executing in the fronthaul transmitter 11. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the embodiments of the method illustrated in FIG. 4.

A determiner 70 corresponds to step 40. An estimator 72 corresponds to step 42. A compressor 74 corresponds to step 44. A transmitter 76 corresponds to steps 46 and 48.

Figure 8:
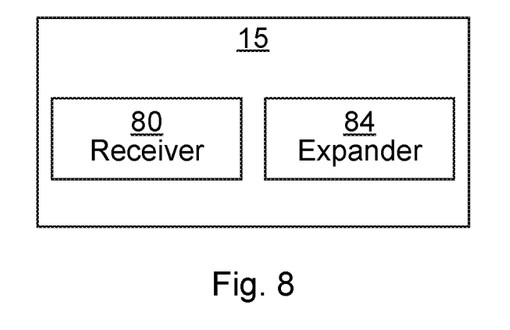
FIG. 8 is a schematic diagram showing functional modules of the fronthaul receiver of FIG. 1 according to one embodiment.

FIG. 8 is a schematic diagram showing functional modules of the fronthaul receiver of FIG. 1 according to one embodiment. The modules are implemented using software instructions such as a computer program executing in the fronthaul receiver 15. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the embodiments of the method illustrated in FIG. 5.

A receiver 80 corresponds to steps 50 and 52. An expander 84 corresponds to step 54.

Figure 9:
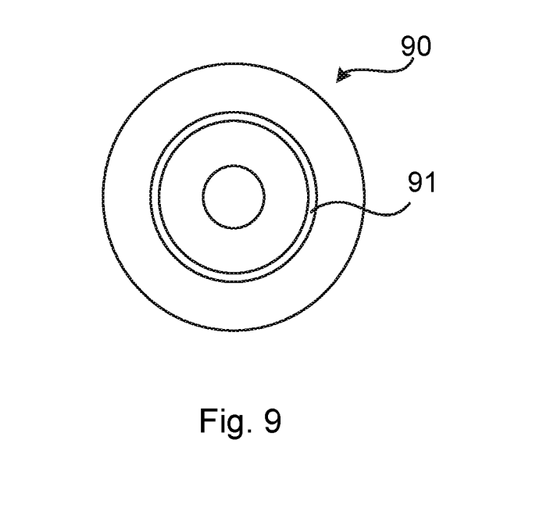
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for reducing bit rate requirement over an uplink fronthaul link, the method being performed in a fronthaul transmitter of a radio network node and comprising the steps of:

determining a group of frequency-domain resource elements having been received over a wireless channel;

estimating channel information in the group of frequency-domain resource elements, the channel information relating to the wireless channel;

reducing for each frequency-domain resource element in the group, using the estimated channel information, a number of bits for representing the respective frequency-domain resource element, to thereby obtain a modified resource element;

transmitting the modified resource elements of the group over the fronthaul link to a fronthaul receiver; and transmitting compression metadata, indicating how the reduction was performed, over the fronthaul link to the fronthaul receiver, wherein the compression metadata comprises the estimated channel information.

2. The method according to claim 1, wherein the step of reducing a number of bits comprises, for each resource element, compensating for effects of the wireless channel based on the channel information.

3. The method according to claim 1, wherein the step of reducing a number of bits comprises, for each resource element, reducing the number of bits based on possible values of the resource element.

4. The method according to claim 1, wherein the step of estimating channel information comprises estimating the channel information based on at least one demodulation reference signal.

5. The method according to claim 1, wherein the step of estimating channel information comprises estimating the channel information based on at least one sounding reference signal.

6. The method according to claim 1, wherein the step of estimating channel information comprises estimating the channel information based on user data.

7. The method according to claim 1, wherein the step of reducing a number of bits comprises interpolating between two instances of channel information to achieve an individual channel information for each frequency-domain resource element.

8. The method according to claim 1, wherein the group of frequency-domain resource elements is a group of frequency-domain resource elements within a resource block, wherein all of the frequency-domain resource elements are associated with one specific user equipment.

9. The method according to claim 1, wherein the step of reducing the number of bits comprises aligning frequency-domain resource element values with possible constellation points of a modulation used for each frequency-domain resource element.

10. The method according to claim 1, wherein the fronthaul transmitter refrains from decoding the frequency-domain resource elements.

11. A fronthaul transmitter for reducing bit rate requirement over an uplink fronthaul link, the fronthaul transmitter being arranged to form part of a radio network node, the fronthaul transmitter comprising:

a processor; and a memory storing instructions that, when executed by the processor, causes the fronthaul transmitter to:

determine a group of frequency-domain resource elements having been received over a wireless channel;

estimate channel information in the group of frequency-domain resource elements, the channel information relating to the wireless channel;

reduce for each frequency-domain resource element in the group, using the estimated channel information, a number of bits for representing the respective frequency-domain resource element, to thereby obtain a modified resource element;

transmit the modified resource elements of the group over the fronthaul link to a fronthaul receiver; and transmit compression metadata, indicating how the reduction was performed, over the fronthaul link to the fronthaul receiver, wherein the compression metadata comprises the estimated channel information.

12. The fronthaul transmitter according to claim 11, wherein the instructions to reduce a number of bits comprise instructions that, when executed by the processor, causes the fronthaul transmitter to, for each resource element, compensate for effects of the wireless channel based on the channel information.

13. The fronthaul transmitter according to claim 11, wherein the instructions to reduce a number of bits comprise instructions that, when executed by the processor, causes the fronthaul transmitter to, for each resource element, reduce the number of bits based on possible values of the resource element.

14. The fronthaul transmitter according to claim 11, wherein the instructions to estimate channel information comprise instructions that, when executed by the processor, causes the fronthaul transmitter to estimate the channel information based on at least one demodulation reference signal.

15. The fronthaul transmitter according to claim 11, wherein the instructions to estimate channel information comprise instructions that, when executed by the processor, causes the fronthaul transmitter to estimate the channel information based on at least one sounding reference signal.

16. The fronthaul transmitter according to claim 11, wherein the instructions to estimate channel information comprise instructions that, when executed by the processor, causes the fronthaul transmitter to estimate the channel information based on user data.

17. The fronthaul transmitter according to claim 11, wherein the instructions to reduce a number of bits comprise instructions that, when executed by the processor, causes the fronthaul transmitter to interpolate between two instances of channel information to achieve an individual channel information for each frequency-domain resource element.

18. The fronthaul transmitter according to claim 11, wherein the group of frequency-domain resource elements is a group of frequency-domain resource elements within a resource block, wherein all of the frequency-domain resource elements are associated with one specific user equipment.

19. The fronthaul transmitter according to claim 11, wherein the instructions to reduce the number of bits comprise instructions that, when executed by the processor, causes the fronthaul transmitter to align frequency-domain resource element values with possible constellation points of a modulation used for each frequency-domain resource element.

20. The fronthaul transmitter according to claim 11, wherein the fronthaul transmitter comprises instructions that, when executed by the processor, causes the fronthaul transmitter to refrain from decoding the frequency-domain resource elements.

21. A method for reducing bit rate requirement over an uplink fronthaul link, the method being performed in a fronthaul receiver of a radio network node and comprising the steps of:

receiving, over the fronthaul link from a fronthaul transmitter, frequency-domain resource elements of a group of frequency-domain resource elements having been received over a wireless channel;

receiving compression metadata indicating how a bit usage reduction was performed for the frequency-domain resource elements; and increasing for each frequency-domain resource element in the group, using the compression metadata, a number of bits for representing the respective frequency-domain resource element, the increasing being essentially an inverse operation of a corresponding reduction performed by the fronthaul transmitter, wherein the compression metadata is estimated channel information obtained by the fronthaul transmitter.

22. The method according to claim 21, wherein the step of increasing a number of bits comprises interpolating between two instances of channel information to achieve an individual channel information for each frequency-domain resource element.

23. The method according to claim 21, wherein the group of frequency-domain resource elements is a group of frequency-domain resource elements within a resource block, wherein all of the frequency-domain resource elements are associated with one specific user equipment.

24. The method according to claim 21, wherein the step of increasing a number of bits comprises, for each resource element, decompensating for effects of wireless channel compensation performed by the fronthaul transmitter, based on the channel information.

25. A fronthaul receiver for reducing bit rate requirement over an uplink fronthaul link, the fronthaul receiver being arranged to form part of a radio network node, the fronthaul transmitter comprising:

a processor; and a memory storing instructions that, when executed by the processor, causes the fronthaul receiver to:

receive, over the fronthaul link from a fronthaul transmitter, frequency-domain resource elements of a group of frequency-domain resource elements having been received over a wireless channel;

receive compression metadata indicating how a bit usage reduction was performed for the frequency-domain resource elements; and increase for each frequency-domain resource element in the group, using the compression metadata, a number of bits for representing the respective frequency-domain resource element, the increasing being essentially an inverse operation of a corresponding reduction performed by the fronthaul transmitter, wherein the compression metadata is estimated channel information obtained by the fronthaul transmitter.

26. The fronthaul receiver according to claim 25, wherein the instructions to increase a number of bits comprise instructions that, when executed by the processor, causes the fronthaul receiver to interpolate between two instances of channel information to achieve an individual channel information for each frequency-domain resource element.

27. The fronthaul receiver according to claim 25, wherein the group of frequency-domain resource elements is a group of frequency-domain resource elements within a resource block, wherein all of the frequency-domain resource elements are associated with one specific user equipment.

28. The fronthaul receiver according to claim 25, wherein the instructions to increase a number of bits comprise instructions that, when executed by the processor, causes the fronthaul receiver to, for each resource element, decompensate for effects of wireless channel compensation performed by the fronthaul transmitter, based on the channel information.

* * * * *